(12) United States Patent
Trzaskos (10) Patent No.: US 12,092,151 B2
(45) Date of Patent: Sep. 17, 2024

(54) MULTI-PIVOT TIMING CHAIN WITH LINK FLEXURES

(71) Applicant: Microsoft Technology Licensing, LLC, Redmond, WA (US)

(72) Inventor: James Trzaskos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 17/807,659

(22) Filed: Jun. 17, 2022

(65) Prior Publication Data

US 2023/0407907 A1 Dec. 21, 2023

(51) Int. Cl.
*F16C 11/04* (2006.01)
*E05D 3/12* (2006.01)

(52) U.S. Cl.
CPC .............. *F16C 11/04* (2013.01); *E05D 3/122* (2013.01); *E05Y 2900/606* (2013.01)

(58) Field of Classification Search
CPC ..... F16C 11/04; E05D 3/122; E05Y 2900/606
See application file for complete search history.

(56) References Cited

U.S. PATENT DOCUMENTS

| | | | |
|---|---|---|---|
| 8,125,759 B2 | 2/2012 | Fukuma et al. | |
| 8,720,011 B1 * | 5/2014 | Hsu | E05D 3/122 |
| | | | 16/354 |
| 8,869,352 B2 * | 10/2014 | Hsu | G06F 1/1681 |
| | | | 16/354 |
| 8,869,353 B2 * | 10/2014 | Hsu | E05D 3/14 |
| | | | 16/366 |
| 8,938,855 B2 * | 1/2015 | Ahn | F16C 11/04 |
| | | | 361/679.01 |
| 9,021,657 B2 * | 5/2015 | Park | G06F 1/1681 |
| | | | 16/354 |
| 9,243,432 B2 * | 1/2016 | Lee | G06F 1/1681 |
| 9,528,308 B2 * | 12/2016 | Cho | E05D 3/122 |
| 9,611,683 B2 * | 4/2017 | Zhang | E05D 11/082 |
| 9,684,343 B2 * | 6/2017 | Tazbaz | G06F 1/1618 |
| 9,719,280 B2 * | 8/2017 | Tian | H05K 5/0226 |

(Continued)

FOREIGN PATENT DOCUMENTS

EP 3955236 A1 2/2022

OTHER PUBLICATIONS

"International Search Report and Written Opinion Issued in PCT Application No. PCT/US23/019719", Mailed Date: Aug. 10, 2023, 13 Pages.

*Primary Examiner* — Christine M Mills
*Assistant Examiner* — Matthew J Sullivan
(74) *Attorney, Agent, or Firm* — Alleman Hall & Tuttle LLP (57) ABSTRACT

A multi-pivot timing chain comprises first timing links in a first timing chain layer coupled together via meshing gear teeth, and second timing links in a second timing chain layer coupled together via meshing gear teeth. Pins rotatably couple the first timing links to the second timing links. Each of the timing links comprises opposing first and second gear portions comprising gear teeth, and first and second flexures connecting the two gear portions. The flexures are in tension and configured to cause a pair of meshing gear teeth in an adjacent timing chain layer to be in compression, thereby creating resistance to rotation of the timing links that comprise the meshing gear teeth.

20 Claims, 9 Drawing Sheets

(56) References Cited

U.S. PATENT DOCUMENTS

| | | | |
|---|---|---|---|
| 10,244,653 B2 * | 3/2019 | Hsu | E05D 11/0054 |
| 10,268,243 B2 * | 4/2019 | Zhang | G06F 1/1637 |
| 10,386,894 B2 * | 8/2019 | Hsu | G06F 1/1616 |
| 10,495,941 B2 * | 12/2019 | Hashimoto | G06F 1/1643 |
| 10,503,210 B2 * | 12/2019 | Lee | G06F 1/1681 |
| 10,781,850 B2 * | 9/2020 | Hsu | F16C 11/04 |
| 10,928,863 B2 * | 2/2021 | Pelissier | G06F 1/1656 |
| 10,975,603 B2 * | 4/2021 | Tazbaz | G06F 1/1616 |
| 11,019,742 B2 * | 5/2021 | Hsu | E05D 3/122 |
| 11,035,160 B2 * | 6/2021 | Lin | G06F 1/1681 |
| 11,061,436 B2 | 7/2021 | O'neil et al. | |
| 11,214,999 B2 * | 1/2022 | Wong | G06F 1/1681 |
| 11,237,596 B2 | 2/2022 | Kim et al. | |
| 11,243,579 B2 * | 2/2022 | Liu | E05D 3/18 |
| 11,266,030 B2 * | 3/2022 | Kim | G06F 1/1652 |
| 11,459,809 B1 * | 10/2022 | Hsu | E05D 3/122 |
| 11,503,728 B2 * | 11/2022 | Sun | E05D 3/18 |
| 11,553,612 B2 * | 1/2023 | Chen | H04M 1/022 |
| 11,693,457 B2 * | 7/2023 | Yao | G06F 1/1681 |
| | | | 16/233 |
| 11,698,665 B2 * | 7/2023 | Hsu | G06F 1/1681 |
| | | | 16/233 |
| 11,720,152 B2 * | 8/2023 | Hsu | G06F 1/1681 |
| | | | 16/354 |
| 11,720,153 B2 * | 8/2023 | Hsu | G06F 1/1652 |
| | | | 16/250 |
| 11,744,030 B2 * | 8/2023 | Zhang | G06F 1/1616 |
| | | | 361/807 |
| 11,758,670 B2 * | 9/2023 | Kim | H05K 5/0226 |
| | | | 361/679.01 |
| 11,886,257 B2 * | 1/2024 | Kim | G06F 1/1641 |
| 2011/0000136 A1 * | 1/2011 | Brun | E05D 11/0081 |
| | | | 49/358 |
| 2015/0131222 A1 | 5/2015 | Kauhaniemi et al. | |
| 2016/0090763 A1 * | 3/2016 | Hsu | G06F 1/1681 |
| | | | 16/354 |
| 2016/0363964 A1 | 12/2016 | Shi et al. | |
| 2017/0287385 A1 * | 10/2017 | Lian | G09F 9/301 |
| 2021/0044683 A1 | 2/2021 | He et al. | |
| 2021/0200275 A1 | 7/2021 | Hsu | |
| 2021/0216109 A1 | 7/2021 | Lin | |
| 2021/0400126 A1 | 12/2021 | Zhang | |
| 2022/0174830 A1 * | 6/2022 | Li | H04M 1/022 |
| 2022/0243509 A1 * | 8/2022 | Takahashi | H04M 1/02 |
| 2023/0026358 A1 * | 1/2023 | Son | G06F 1/1652 |
| 2023/0032983 A1 * | 2/2023 | Feng | G06F 1/1681 |
| 2023/0040036 A1 * | 2/2023 | Lee | G09F 9/30 |
| 2023/0147784 A1 * | 5/2023 | Koo | G06F 1/1616 |
| | | | 361/679.27 |
| 2023/0156942 A1 * | 5/2023 | Ge | H04M 1/022 |
| | | | 361/807 |
| 2023/0193947 A1 * | 6/2023 | Park | G06F 1/1681 |
| | | | 361/807 |
| 2023/0205280 A1 * | 6/2023 | Kim | F16C 11/04 |
| | | | 361/679.27 |
| 2023/0240029 A1 * | 7/2023 | Hashimoto | G06F 1/1681 |
| | | | 361/807 |
| 2023/0273649 A1 * | 8/2023 | Hsu | F16C 11/04 |
| | | | 16/354 |

* cited by examiner

MULTI-PIVOT TIMING CHAIN WITH LINK FLEXURES

BACKGROUND

Many products and devices include components that rotate or pivot relative to one another.

SUMMARY

According to one aspect of the present disclosure, a multi-pivot timing chain comprises a plurality of first timing links in a first timing chain layer, where the first timing links are coupled together via meshing gear teeth on opposing ends of each of the first timing links. A plurality of second timing links are located in a second timing chain layer that is adjacent to the first timing chain layer. The second timing links are coupled together via meshing gear teeth on opposing ends of each of the second timing links. A plurality of pins rotatably couple the first timing links in the first timing chain layer to the second timing links in the second timing chain layer.

Each of the first timing links and each of the second timing links comprises a first gear portion comprising a first plurality of gear teeth, a second gear portion opposite the first gear portion and comprising a second plurality of gear teeth, a first flexure connecting a first side of the first gear portion to a first side of the second gear portion, and a second flexure opposite to the first flexure, the second flexure connecting a second side of the first gear portion to a second side of the second gear portion. The first flexure and the second flexure of at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer.

Another aspect provides computing device comprising a flexible display that is supported by a first display-supporting frame and a second display-supporting frame. A hinge assembly rotatably couples the first display-supporting frame to the second display-supporting frame. The hinge assembly comprises a multi-pivot timing chain comprising a plurality of first timing links in a first timing chain layer, where the first timing links are coupled together via meshing gear teeth on opposing ends of each of the first timing links. A plurality of second timing links are located in a second timing chain layer that is adjacent to the first timing chain layer. The second timing links are coupled together via meshing gear teeth on opposing ends of each of the second timing links. A plurality of pins rotatably couple the first timing links in the first timing chain layer to the second timing links in the second timing chain layer.

Each of the first timing links and each of the second timing links comprises a first gear portion comprising a first plurality of gear teeth, a second gear portion opposite the first gear portion and comprising a second plurality of gear teeth, a first flexure connecting a first side of the first gear portion to a first side of the second gear portion, and a second flexure opposite to the first flexure, the second flexure connecting a second side of the first gear portion to a second side of the second gear portion. The first flexure and the second flexure of at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer.

Another aspect provides method of assembling a multi-pivot timing chain, where the multi-pivot timing chain comprises two first timing links in a first timing chain layer, with each of the first timing links comprising gear teeth on opposing ends of first timing link. A second timing link is located in a second timing chain layer adjacent to the first timing chain layer, with the second timing link comprising gear teeth on opposing ends. Each of the first timing links and the second timing link comprises a first gear portion comprising a first plurality of gear teeth, with the first gear portion defining a first aperture. A second gear portion is located opposite the first gear portion, with the second gear portion comprising a second plurality of gear teeth and defining a second aperture. A first flexure connects a first side of the first gear portion to a first side of the second gear portion. A second flexure opposite to the first flexure connects a second side of the first gear portion to a second side of the second gear portion.

The method comprises meshing the gear teeth of the first gear portion of one of the first timing links with the gear teeth of the second gear portion of the other first timing link. A first pin is inserted through the second aperture of the second gear portion of the second timing link and through the first aperture of the first gear portion of the one of the first timing links to rotatably couple the second timing link to the one of the first timing links, wherein the first aperture of the first gear portion of the second timing link is misaligned relative to the second aperture of the second gear portion of the other first timing link.

A second pin is then inserted through the first aperture of the first gear portion of the second timing link and through the second aperture of the second gear portion of the other first timing link to rotatably couple the second timing link to the other first timing link, and to bring the first aperture of the first gear portion of the second timing link into concentric alignment with the second aperture of the second gear portion of the other first timing link, thereby creating tension in the first flexure and the second flexure of the second timing link, wherein the tension acts through the first pin and the second pin to compress the meshing gear teeth of the two first timing links, thereby creating resistance to rotation of the two first timing links.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many products and devices include components that rotate or pivot relative to one another. In some examples these devices utilize one or more hinges that rotatably couple two components. For example, laptop computing devices can include a first substrate that is rotatably coupled to a second substrate via a hinge assembly.

In some devices such as laptop computing devices, it is desirable to enable users to rotate the two components relative to one another while also providing a measure of resistance to rotation that causes the components to maintain a given angular orientation relative to one another. However, mechanisms that generate such resistance while also providing consistent, reliable operation can prove challenging to design.

Accordingly, to address one or more of these issues, examples are disclosed that relate to a multi-pivot timing chain that includes timing links having flexures in tension. As described in more detail below, the multi-pivot timing chain comprises two or more timing chain layers that each include a plurality of timing links. One or more of the timing links include opposing flexures that are in tension and are configured to compress a pair of meshing gear teeth in timing links in an adjacent timing chain layer, thereby creating resistance to rotation of the timing links. Advantageously, timing chains of the present disclosure provide an inexpensive, mechanically simple and reliable mechanism for creating a desired resistance to rotation between components. Additionally and as described further below, examples disclosed herein can be easily tuned and modified to define and provide desired amounts of resistance and friction along the curvature of the timing chain.

Figure 1A:
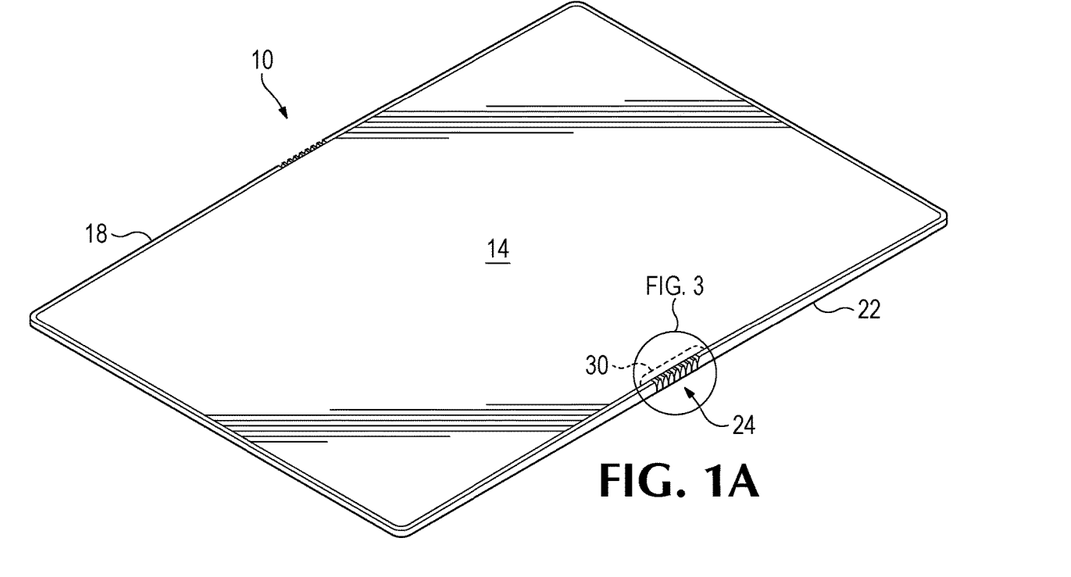
FIG. 1A shows a computing device that includes a multi-pivot timing chain according to an example of the present disclosure.
Figure 1B:
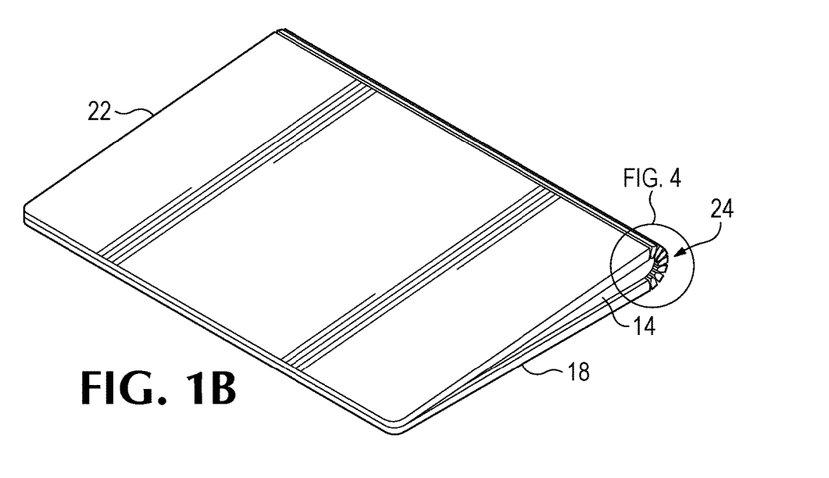
FIG. 1B shows the computing device of FIG. 1A folded according to an example of the present disclosure.

With reference now to FIGS. 1A and 1B, one example of a computing device that can incorporate one or more multi-pivot timing chains of the present disclosure is provided. In this example, computing device 10 includes a flexible display 14 supported by a first display-supporting frame 18 and a second display-supporting frame 22. In this example, the flexible display 14 can deform as the first display-supporting frame 18 and second display-supporting frame 22 surfaces beneath the flexible display are folded. In various examples different flexible display technologies and materials can be utilized, including but not limited to flexible organic light-emitting diode (OLED)-based displays and flexible electronic paper based displays.

In other examples and as noted above, the two substrates rotatably coupled together may take other suitable forms, including but not limited to a display screen and an input surface of a laptop computer, first and second display screens of a foldable computing device, and substrates of a wearable device. In still other examples, multi-pivot timing chains of the present disclosure may be utilized in any other device or subassembly that couples two components for rotatably motion relative to one another, such as headphones or other wearable devices, stands or mounting structures, and other devices or components.

In the example of FIGS. 1A and 1B, the computing device 100 is folded approximately 180 degrees from a flat configuration in which the first display-supporting frame 18 and second display-supporting frame 22 are oriented end-to-end, to a folded configuration of FIG. 1B in which the first display-supporting frame and second display-supporting frame are closed with the flexible display 14 sandwiched therebetween. In some examples, the first display-supporting frame 18 and a second display-supporting frame 22 can also be folded in the opposite direction such that the flexible display 14 is located on the outside of both frames.

In this example the first display-supporting frame 18 and second display-supporting frame 22 are rotatably coupled to one another by a hinge assembly 24. In some examples, the hinge assembly 24 can comprise one or more living hinges that couple the two frames for pivoting motion relative to one another. Additionally or alternatively, in other examples other hinge configurations may be utilized. As described in more detail below, the hinge assembly 24 also includes one or more multi-pivot timing chains 30 that control angular movement of the first display-supporting frame 18 and second display-supporting frame 22 about the hinge assembly 24, and advantageously provide resistance to rotation of the two frames relative to one another.

Figure 3:
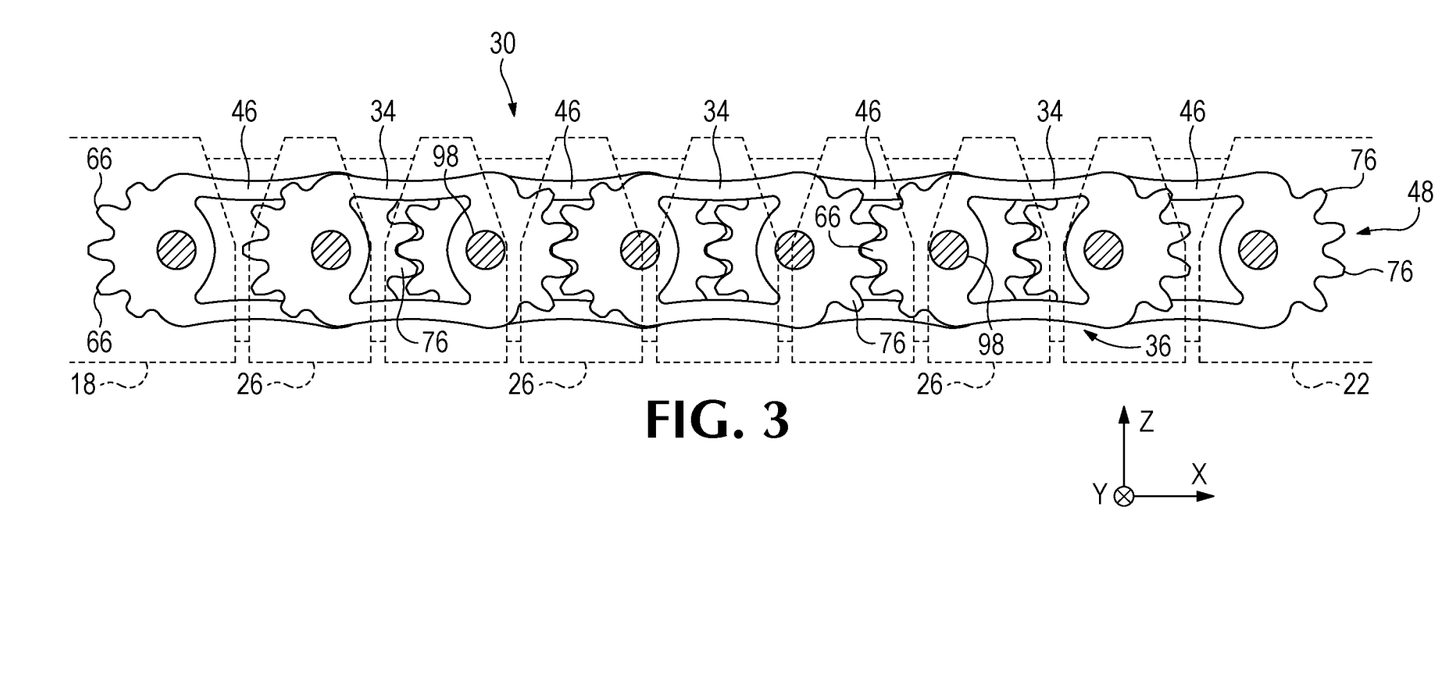
FIG. 3 shows a side view of the multi-pivot timing chain of FIG. 2 in the computing device of FIG. 1A.
Figure 4:
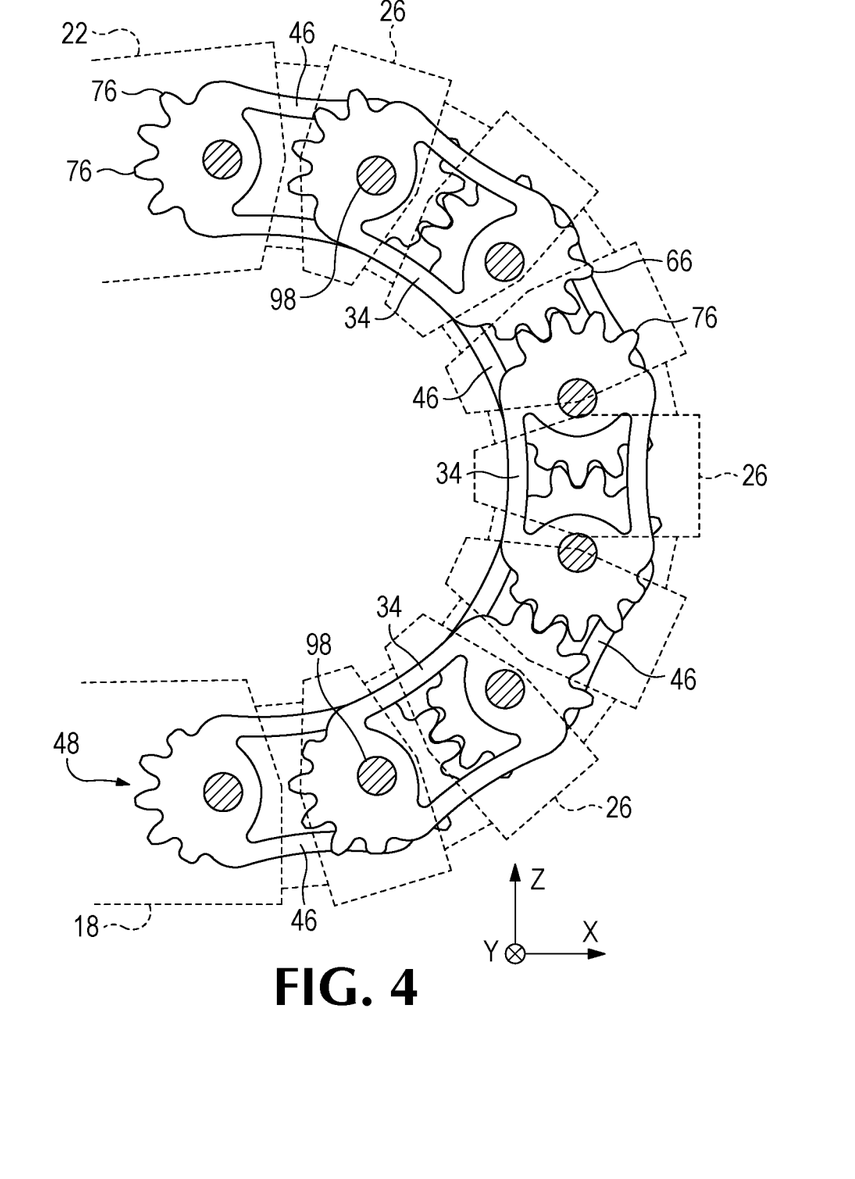
FIG. 4 shows the same multi-pivot timing chain folded in the computing device of FIG. 1B.

In the present example and with reference now to FIGS. 3 and 4, the hinge assembly 24 includes a plurality of articulated segments 26 that are configured to enable folding of the hinge assembly. The articulated segments 26 are illustrated in phantom for ease of description of the multi-pivot timing chain 30 located inwardly from outer portions of the segments and described in more detail below. With reference also to FIG. 1B, in this example each segment 26 extends substantially the length of the hinge assembly 24. In this example the hinge assembly 24 utilizes seven articulated segments 26. In other examples, more or less than seven segments can be utilized. In this example the articulated segments 26 extend in the y-axis direction and are configured to extend parallel to one another. In some examples, the multi-pivot timing chain 30 can extend through apertures in the articulated segments.

Figure 2:
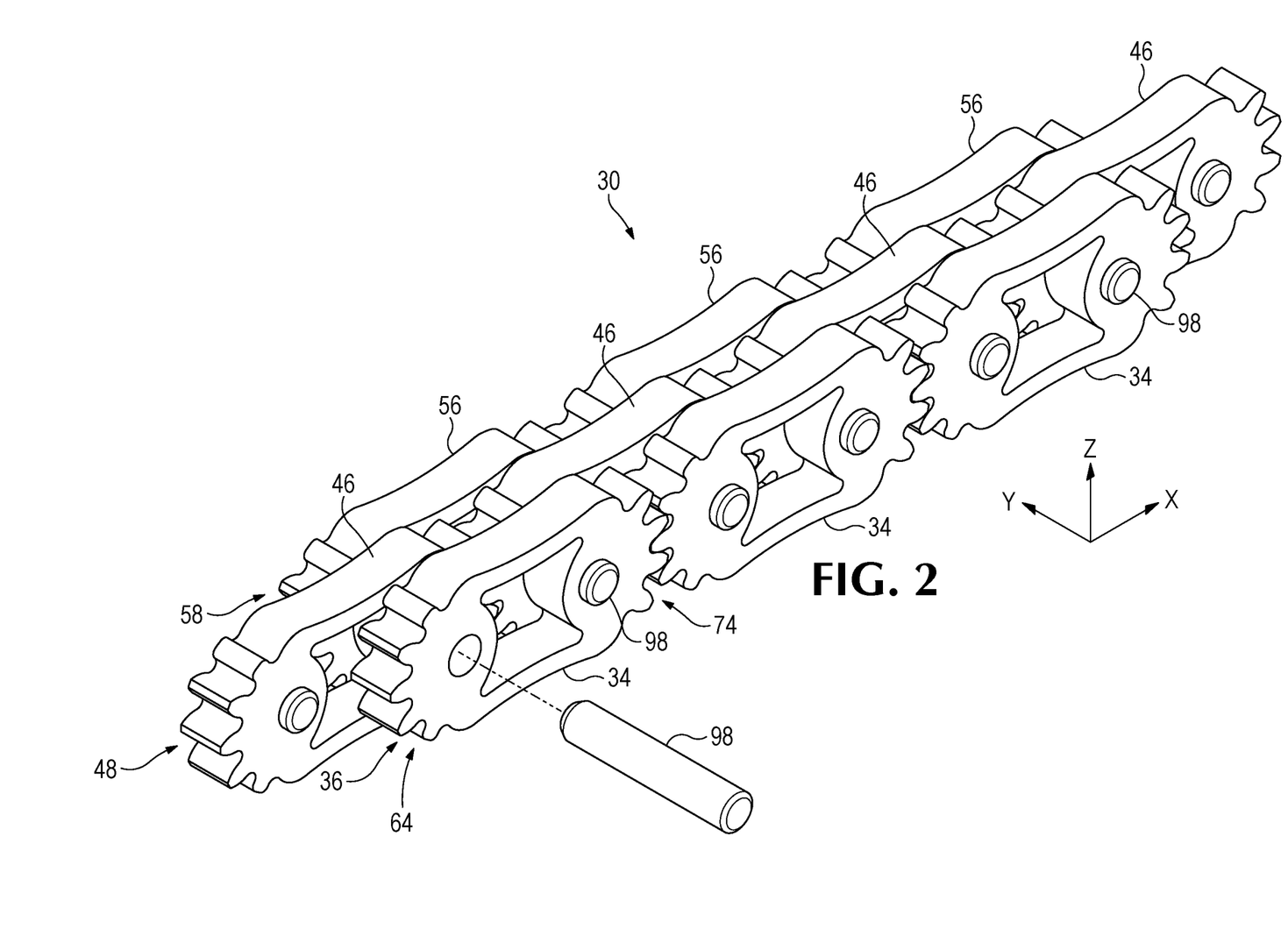
FIG. 2 shows a perspective view of a multi-pivot timing chain according to examples of the present disclosure.

With reference now to FIGS. 2-4 and in one potential advantage of the present disclosure, the hinge assembly 24 comprises a multi-pivot timing chain 30 that provides a structurally robust and reliable mechanism for creating a desired resistance to rotation of the first display-supporting frame 18 and second display-supporting frame 22. Additionally and as described in more detail below, aspects of the multi-pivot timing chain 30 can be tuned and modified to provide desired magnitudes of resistance along the curvature of the timing chain.

In this example, the multi-pivot timing chain 30 includes three timing chain layers that are each comprised of a plurality of individual timing links coupled together via meshing gear teeth. In other examples and as described further below, multi-pivot timing chains of the present disclosure can utilize two timing chain layers or four or more timing chain layers. In the example of FIGS. 2-4, the multi-pivot timing chain 30 comprises a plurality of first timing links 34 in a first timing chain layer 36. Each of the first timing links 34 is coupled to at least one adjacent first timing link 34 via meshing gear teeth on opposing ends of each of the first timing links. Adjacent to the first timing chain layer 36 is a second timing chain layer 48 that comprises a plurality of second timing links 46 coupled together via meshing gear teeth on opposing ends of each of the second timing links. The third timing chain layer 58 is adjacent to the other side of the second timing chain layer 48 such that the second timing chain layer is positioned between the first timing chain layer 36 and the third timing chain layer. Like the first and second timing chain layers, the third timing chain layer 58 comprises a plurality of third timing links 56 coupled together via meshing gear teeth on opposing ends of each of the third timing links.

In the present example, each of the first timing links 34, second timing links 46, and third timing links 56 have the same configuration. Alternatively expressed, each of the first timing links 34, second timing links 46, and third timing links 56 are the same component. In this manner, in one potential advantage of the present disclosure and as described in more detail below, a single configuration of timing link can be utilized for each of the first timing links 34, second timing links 46, and third timing links 56, thereby reducing the number of different components needed to assemble the multi-pivot timing chain 30. In other examples, one or more of the first timing links 34, second timing links 46, and/or third timing links 56 may have a configuration different from the configuration described in more detail below.

Figure 5:
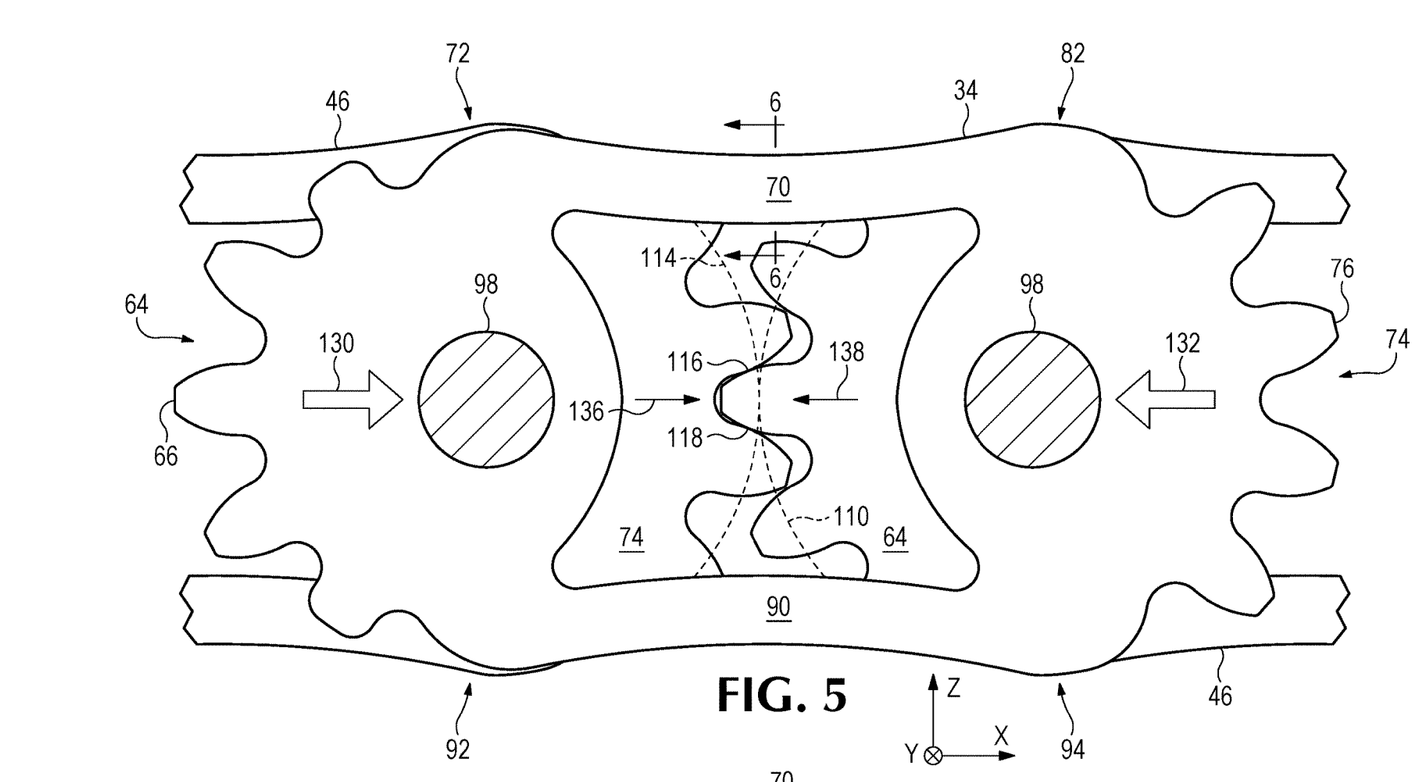
FIG. 5 shows an enlarged view of a first timing link and the meshing gear teeth of two second timing links of the multi-pivot timing chain of FIG. 2.
Figure 7:
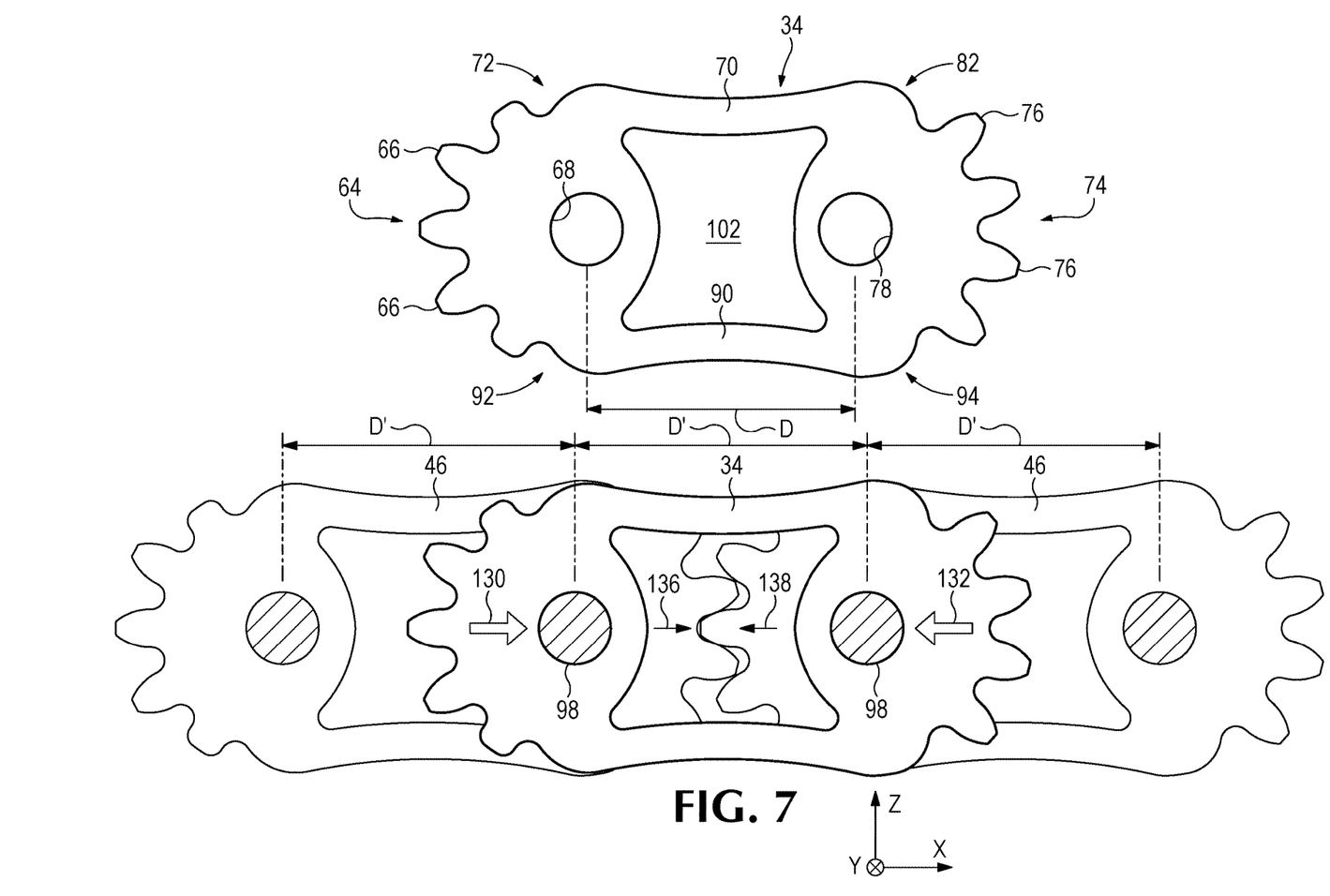
FIG. 7 shows a first timing link before and after installation into the multi-pivot timing chain of FIG. 2 according to examples of the present disclosure.

Following is a more detailed description of the configuration of each of the first timing links 34. As noted above, in the present example the second timing links 46 and the third timing links 56 also have the same configuration as the first timing links 34. Accordingly, the following descriptions of first timing links 34 also apply to the second timing links 46 and the third timing links 56. With reference to FIGS. 2, 5 and 7, each of the first timing links 34 comprises a first gear portion 64 that includes a plurality of first gear teeth 66. In the present example, the first gear portion 64 includes five first gear teeth 66. In other examples, fewer or more first gear teeth 66 may be utilized. Each of the first timing links 34 also comprises a second gear portion 74 opposite to the first gear portion 64 that includes a plurality of second gear teeth 76. In the present example, the second gear portion 74 includes four second gear teeth 76. In other examples, fewer or more second gear teeth 76 may be utilized.

In one potential advantage of the present disclosure, each of the first timing links 34 also includes a first flexure 70 that connects a first side 72 of the first gear portion 64 to a first side 82 of the second gear portion 74. Similarly, each of the first timing links 34 also includes a second flexure 90 opposite to the first flexure 70, with the second flexure 90 connecting a second side 92 of the first gear portion 64 to a second side 94 of the second gear portion 74. Advantageously and with reference to FIGS. 5 and 7, each of the first flexures 70 and the second flexures 90 are curved between their corresponding first gear portion 64 and second gear portion 74. More particularly and as shown in FIG. 7, the curvature of each of the first flexures 70 and each of the second flexures 90 is inwardly concave toward a center 102 of the first timing link 34.

In this manner, in one potential advantage of the present disclosure and as described in more detail below, when assembled to form the multi-pivot timing chain 30, both the first flexure 70 and the second flexure 90 are lengthened to thereby create tension in the flexures. In this example, when the inwardly concave first flexure 70 and the second flexure 90 are lengthened and thereby somewhat straightened, their curvature creates a return force that manifests as tension in the flexures. Correspondingly, the tension in the first flexure 70 and the second flexure 90 causes a pair of meshing gear teeth in timing links in at least one adjacent timing chain layer to be compressed, thereby creating resistance to rotation of such timing links. In the present example, the tension in the first flexure 70 and the second flexure 90 causes a pair of meshing gear teeth of timing links in the second timing chain layer 48 to be compressed, thereby creating resistance to rotation of these timing links.

In the present example and like the first timing links 34, each of the second timing links 46 also includes an inwardly-curving first flexure 70 that connects a first side 72 of the first gear portion 64 to a first side 82 of the second gear portion 74. Similarly, each of the second timing links 46 also includes an inwardly-curving second flexure 90 opposite to the first flexure 70, with the second flexure 90 connecting a second side 92 of the first gear portion 64 to a second side 94 of the second gear portion 74. In this manner, in another potential advantage of the present disclosure and as described in more detail below, when assembled to form the multi-pivot timing chain 30, the tension in the first flexure 70 and the second flexure 90 causes the second timing links 46 to compress corresponding pairs of meshing gear teeth of timing links in the first timing chain layer 36 and in the third timing chain layer 58, thereby creating additional resistance to rotation of these timing links in these layers.

Also like the first timing links 34, each of the third timing links 56 in the third timing chain layer 58 includes an inwardly-curving first flexure 70 that connects a first side 72 of the first gear portion 64 to a first side 82 of the second gear portion 74. Similarly, each of the third timing links 56 also includes an inwardly-curving second flexure 90 opposite to the first flexure 70, with the second flexure 90 connecting a second side 92 of the first gear portion 64 to a second side 94 of the second gear portion 74. In this manner, in another potential advantage of the present disclosure and as described in more detail below, when assembled to form the multi-pivot timing chain 30, the tension in the first flexure 70 and the second flexure 90 causes the third timing links 56 to compress corresponding pairs of meshing gear teeth of timing links in the second timing chain layer 48, thereby creating additional resistance to rotation of these timing links.

With reference again to FIG. 2, the timing links in the first timing chain layer 36, second timing chain layer 48, and third timing chain layer 58 are rotatably coupled together via a plurality of pins 98. As shown in FIGS. 3 and 4, coupling the timing links together via the pins 98 enables the multi-pivot timing chain 30 to rotate at each of the pins and thereby allow the chain to transcribe various curvatures and orientations. Additionally, in another potential advantage of the present disclosure and as described further below, coupling the timing links together via the pins 98 creates the tension in the first flexures 70 and the second flexures 90 of the links, which correspondingly compresses the corresponding pairs of meshing gear teeth of the timing links in the timing chain layers.

As shown in FIG. 2, pins 98 are chamfered on each end to ease the insertion of the pins through the apertures in the first timing links 34, second timing links 46, and third timing links 56. Additionally, as described further below and in another potential advantage of the present disclosure, the process of inserting pins 98 through the apertures in the timing links generates the tension in the first flexures 70 and second flexures 90 of the links along with the corresponding compression in the corresponding pairs of meshing gear teeth of the timing links in the timing chain layers.

With reference now to FIGS. 8A-8C and 10, a method 200 will now be described for assembling a multi-pivot timing chain according to examples of the present disclosure. The following description of the method 200 is provided with reference to the components described herein. For example, the method 200 may be performed to assemble the multi-pivot timing chain 30 of FIGS. 1-9. It will also be appreciated that the method 200 also may be performed in other contexts and to assemble other configurations of multi-pivot timing chains.

Figure 10:
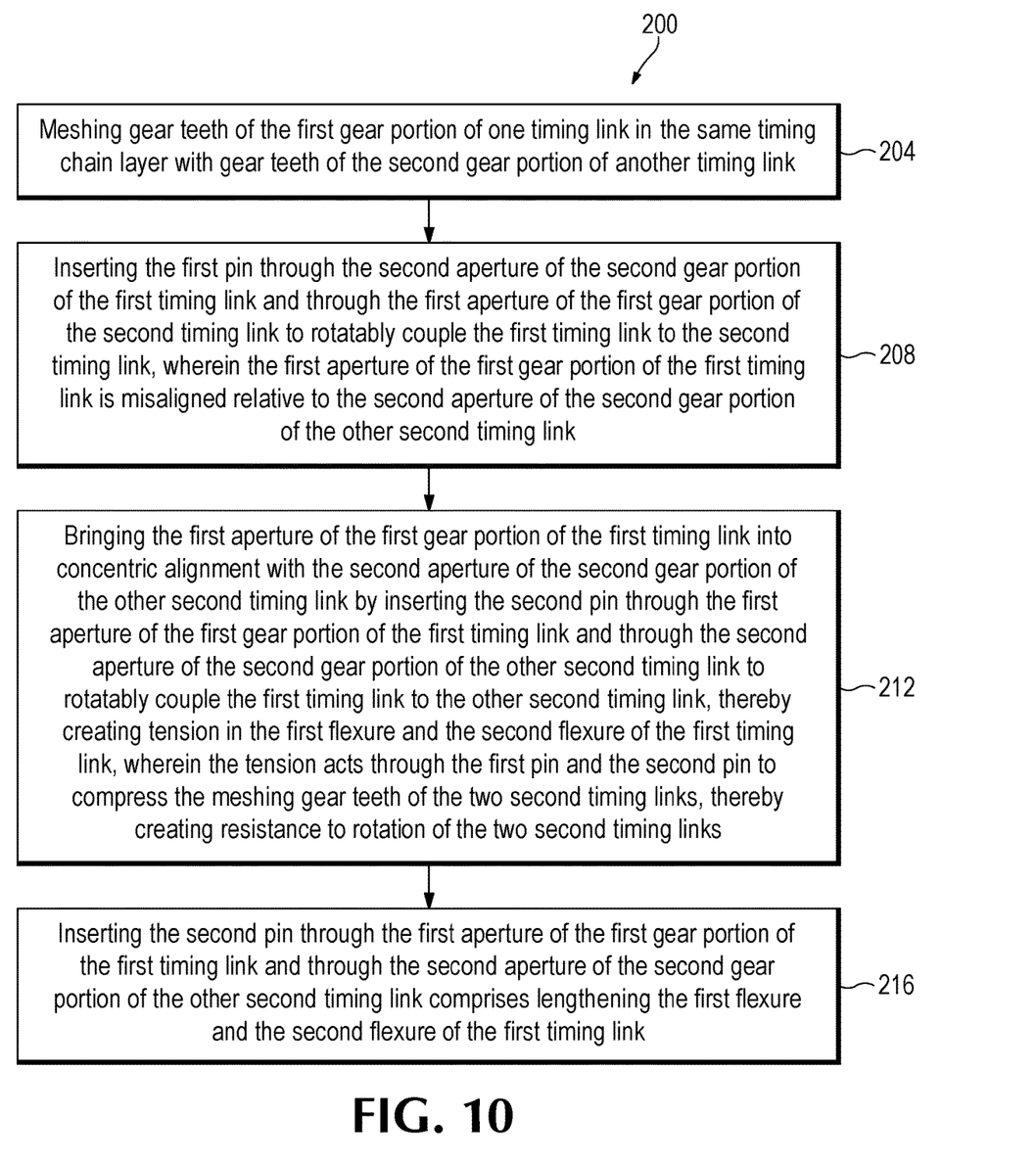
FIG. 10 is a flowchart illustrating a method of assembling a multi-pivot timing chain according to examples of the subject disclosure.

With reference to the flowchart of FIG. 10, at 204 the method 200 comprises meshing gear teeth of the first gear portion of one timing link with gear teeth of the second gear portion of another timing link in the same timing chain layer. For example and with reference to FIG. 8A, the first gear teeth 66 of the first gear portion 64 of one of the second timing links 46 in the second timing chain layer 48 are meshed with the second gear teeth 76 of the second gear portion 74 of another one of the second timing links 46.

Figure 8A:
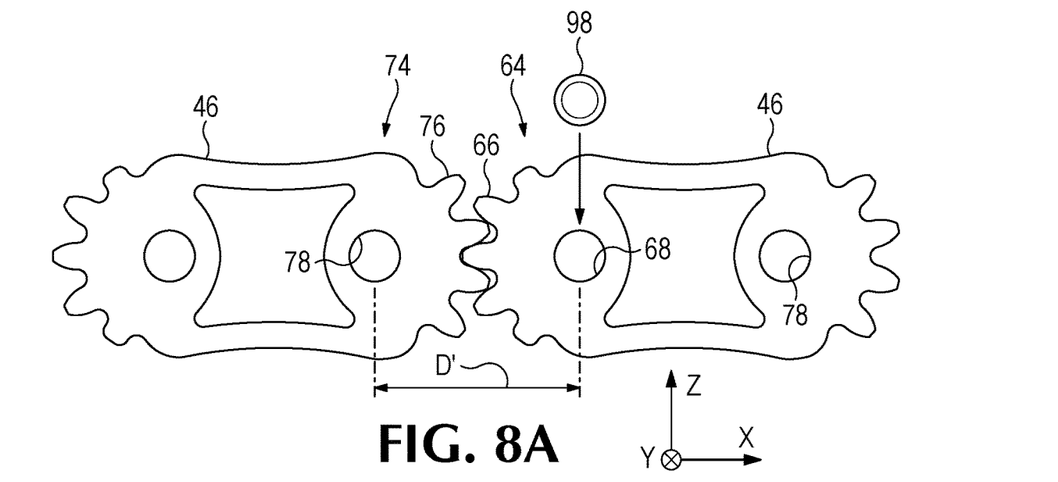
FIGS. 8A, 8B, and 8C show a sequence of rotatably coupling a first timing link to two second timing links according to examples of the present disclosure.
Figure 8B:
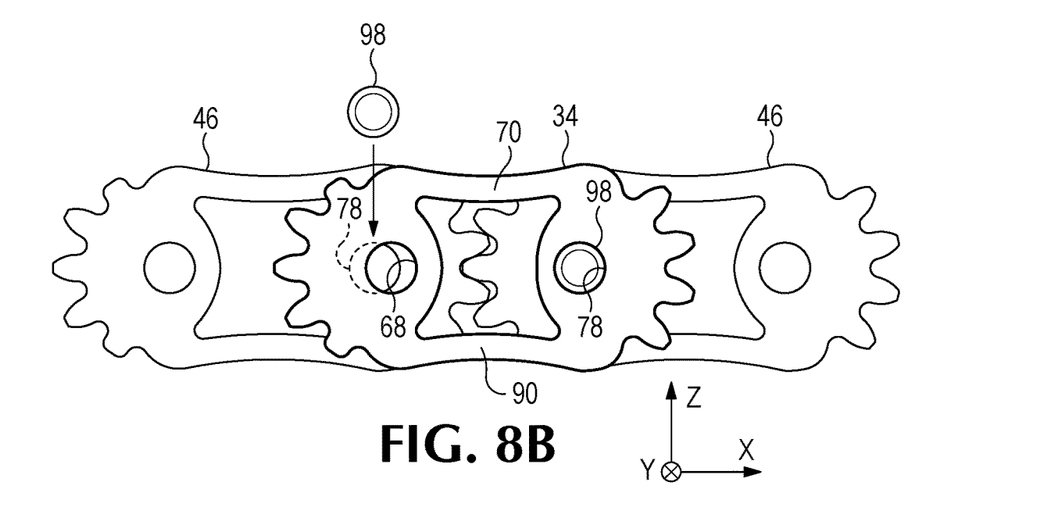
Figure 8C:
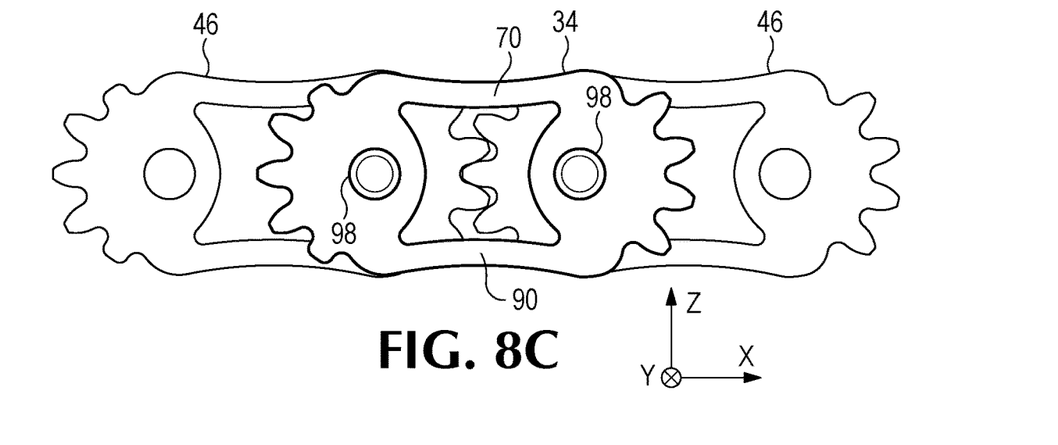

As shown in FIG. 8B, one of the first timing links 34 is then positioned over the two meshed second timing links 46. More particularly, in this example the first timing link 34 is positioned such that its second aperture 78 defined in its second gear portion 74 is concentrically aligned with the first aperture 68 in the first gear portion 64 of the underlying second timing link 46. With these two apertures aligned, at 208 the method 200 includes inserting a first pin 98 through the second aperture 78 of the second gear portion 74 of the first timing link 34 and through the first aperture 68 of the first gear portion 64 of the underlying second timing link 46 to rotatably couple the first timing link to the second timing link. Additionally and as described further below, with the pin 98 inserted and these two timing links oriented in this manner, the first aperture 68 of the first gear portion 64 of the first timing link 34 is misaligned relative to the second aperture 78 of the second gear portion 74 of the other second timing link 46. More particularly and as illustrated in FIG. 8B, the first aperture 68 of the first gear portion 64 of the first timing link 34 is offset in the positive x-axis direction relative to the second aperture 78 of the second gear portion 74 of the other second timing link 46.

With reference to FIG. 8A, the center-to-center distance between the second aperture 78 and the first aperture 68 of the meshing second timing links 46 is indicated at D'. As shown in FIG. 7 and also depicted in FIG. 8B, prior to complete assembly the center-to-center distance between the first aperture 68 and second aperture 78 of the overlying first timing link 34 is a value D that is less than D'. Accordingly, with reference again to FIG. 10 and also FIGS. 8B and 8C, at 212 the method 200 includes bringing the first aperture 68 of the first gear portion 64 of the first timing link 34 into concentric alignment with the second aperture 78 of the second gear portion 74 of the other second timing link 46 by inserting a second pin 98 through the first aperture of the first gear portion of the first timing link and through the second aperture of the second gear portion of the other second timing link to rotatably couple the first timing link to the other second timing link. In this manner, tension is created in the first flexure 70 and the second flexure 90 of the first timing link 34. Further, this tension acts through the first and second pins 98 to compress the meshing gear teeth of the underlying two second timing links 46, thereby creating resistance to rotation of the two second timing links.

With reference again to FIG. 7 and FIGS. 8B and 8C, this tension is manifested in the change in the center-to-center distance between the first aperture 68 and the second aperture 78 of the first timing link 34 from pre-assembly to post-assembly stages. As shown in FIG. 7, in the pre-assembly stage the center-to-center distance between the first aperture 68 and second aperture 78 of the overlying first timing link 34 is a value D. When the second pin 98 is inserted through the first aperture 68 of the first gear portion 64 of the first timing link 34 and through the second aperture 78 of the second gear portion 74 of the other second timing link 46, both the first flexure 70 and the second flexure 90 are stretched into tension to enable the first aperture of the first timing link to become aligned with the second aperture of the other second timing link. In this post-assembly stage, the center-to-center distance between the first aperture 68 and second aperture 78 of the overlying first timing link 34 is now increased to a value D'. Accordingly, and with reference again to FIG. 10, at 216 the method 200 includes, wherein inserting the second pin 98 through the first aperture 68 of the first gear portion 64 of the first timing link 34 and through the second aperture 78 of the second gear portion 74 of the other second timing link 46 comprises lengthening the first flexure 70 and the second flexure 90 of the first timing link.

With reference to FIGS. 5 and 7, and in another potential advantage of the present disclosure, the tension in the first flexure 70 and the second flexure 90 of the first timing link 34 causes the sidewalls of the first aperture 68 and second aperture 78 of this timing link to generate countervailing compressive forces on the two pins 98 in the directions of action arrows 130 and 132. Correspondingly, the two pins 98 generate similar compressive forces on the sidewall of the second aperture 78 in the second timing link 46 underlying the first aperture 68 of the first timing link 34 (in the direction of action arrow 136), and on the sidewall of the first aperture 68 in the other second timing link 46 underlying the second aperture 78 of the first timing link 34 (in the direction of action arrow 138).

In this manner, and in another potential advantage of the present disclosure, such compressive forces generate tooth-to-tooth interference in the meshing gear teeth of the two second timing links 46, thereby creating resistance to rotation of these gears relative to one another. As shown in FIG. 5, these compressive forces 136, 138 cause the meshing gear teeth to contact one another at least at a first contact area 116 and second contact area 118 along the face and/or flank of the teeth. In this example, the contact areas 116, 118 are along the first operating pitch circle 110 and the second operating pitch circle 114 of the two second timing links 46.

Additionally and as shown in FIG. 5, because the compressive forces 136, 138 generate the tooth-to-tooth interference, the meshing gear teeth of the second timing links 46 have no backlash. Accordingly, and in another potential advantage of the present disclosure, the contact between the meshing gear teeth is continuous as the teeth rotate relative to one another, thereby providing a smooth and uninterrupted resistance to rotation without exhibiting any slop between the gears.

With reference again to FIG. 2, and in another potential advantage of this example, the second timing links 46 in the second timing chain layer 48 operate to generate compressive forces on the mating gear teeth in both the first timing links 34 in the first timing chain layer 36 and in the third timing links 56 in the third timing chain layer 58 as described above. Also and as noted above, the number of timing links in the different timing chain layers and the corresponding length of the multi-pivot timing chain 30 can be increased or decreased according to the requirements of particular devices and implementations.

Figure 6:
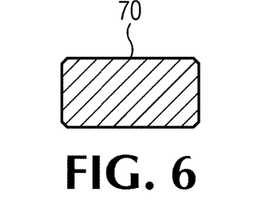
FIG. 6 shows a cross-sectional view of the first flexure taken along line 6-6 in FIG. 5 according to one example of the present disclosure.

With reference now to FIG. 6, in this example the cross section of the first flexure 70 is a quadrilateral in the form of a rounded rectangle. The second flexure 90 can have the same quadrilateral cross section. In another potential advantage of the present disclosure, the cross sectional area and/or shape of the flexures can be varied to alter the load-bearing dynamics of the timing link and create a desired magnitude of tension/compression as described above. In one example and with reference to FIGS. 5 and 6, the first flexure 70 can be modified to reduce the cross sectional area of the flexure and thereby reduce the stiffness of the flexure and the corresponding tension/compression generated by the flexure. It follows that the resistance to rotation of meshing gear teeth in one or more adjacent timing chain layers is correspondingly reduced. Additionally or alternatively, a variety of other three-dimensional shapes and configurations of the flexures can be utilized to create a desired tension/compression force profile. For example, the curvature of each of the first flexures 70 and each of the second flexures 90 can be outwardly convex away from the center of the timing link. Other shapes of flexures that may be utilized include but are not limited to Z-shaped flexures and coiled flexures.

Figure 9:
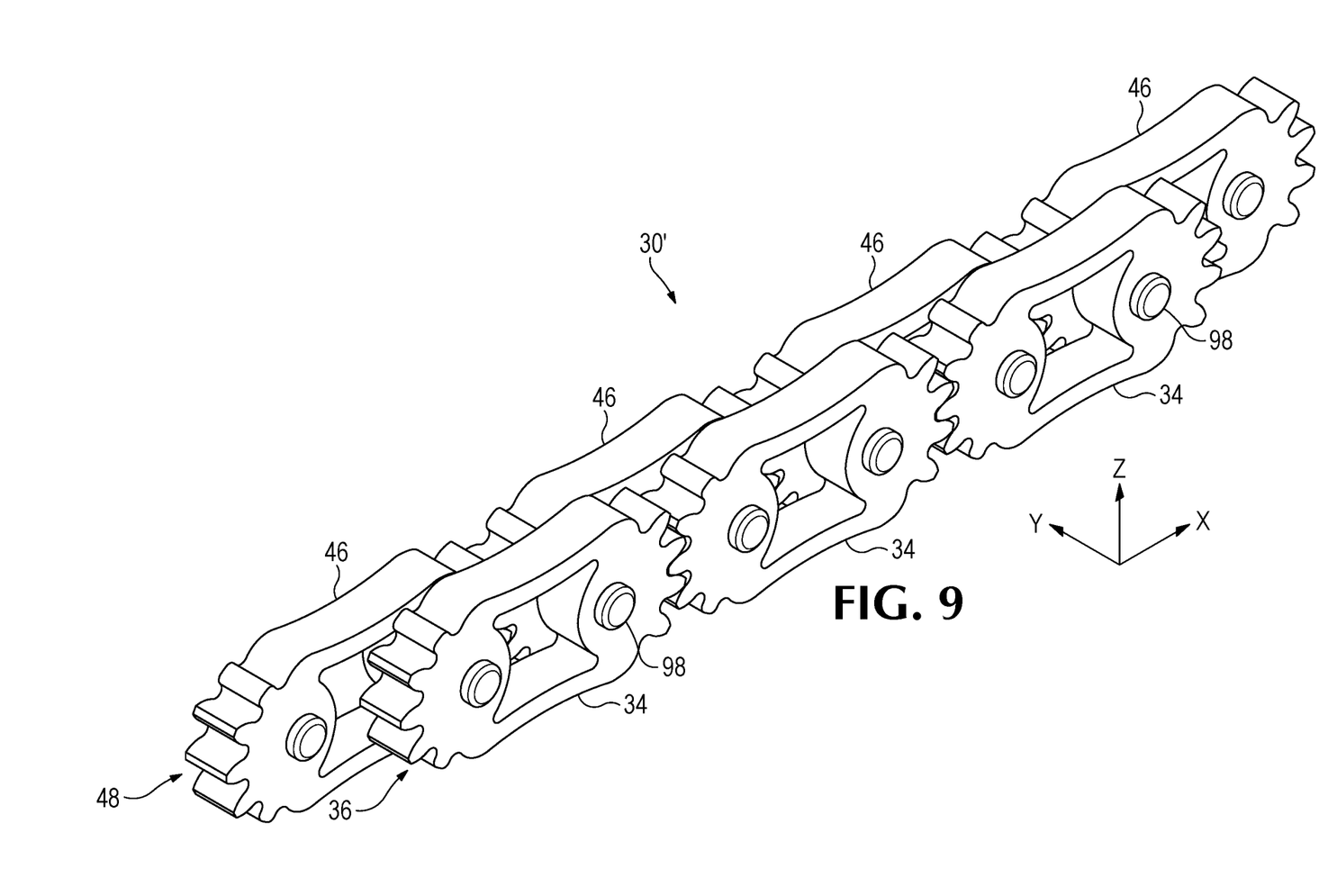
FIG. 9 shows another example of a multi-pivot timing chain according to examples of the present disclosure.

As noted above, in other examples of the present disclosure, fewer than or more than three timing chain layers may be utilized in a multi-pivot timing chain. With reference now to FIG. 9, in one example a multi-pivot timing chain 30' utilizes a first timing chain layer 36 and a second timing chain layer 48 that comprise timing links assembled in the manner described herein.

The following paragraphs provide additional support for the claims of the subject application. One aspect provides a multi-pivot timing chain, comprising: a plurality of first timing links in a first timing chain layer, the first timing links coupled together via meshing gear teeth on opposing ends of each of the first timing links; a plurality of second timing links in a second timing chain layer adjacent to the first timing chain layer, the second timing links coupled together via meshing gear teeth on opposing ends of each of the second timing links; and a plurality of pins rotatably coupling the first timing links in the first timing chain layer to the second timing links in the second timing chain layer, wherein each of the first timing links and each of the second timing links comprises: a first gear portion comprising a plurality of first gear teeth; a second gear portion opposite the first gear portion and comprising a plurality of second gear teeth; a first flexure connecting a first side of the first gear portion to a first side of the second gear portion; and a second flexure opposite to the first flexure, the second flexure connecting a second side of the first gear portion to a second side of the second gear portion; wherein the first flexure and the second flexure of at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer. In some examples, the multi-pivot timing chain additionally or alternatively comprises, wherein the tension in the first flexure and the second flexure creates the compression in the pair of meshing gear teeth in the second timing chain layer via a first pin of the plurality of pins extending through a first aperture defined in the first gear portion of the at least one of the first timing links, and via a second pin of the plurality of pins extending through a second aperture defined in the second gear portion of the at least one of the first timing links. In some examples, the multi-pivot timing chain additionally or alternatively comprises, wherein the first flexure and the second flexure in each of the first timing links are in tension and are configured to cause each pair of meshing gear teeth in the second timing chain layer to be in compression, thereby creating resistance to rotation of the second timing links in the second timing chain layer. In some examples, the multi-pivot timing chain additionally or alternatively comprises, wherein the first flexure and the second flexure in each of the second timing links are in tension and are configured to cause each pair of meshing gear teeth in the first timing chain layer to be in compression, thereby creating resistance to rotation of the first timing links in the first timing chain layer. In some examples, the multi-pivot timing chain additionally or alternatively comprises, wherein each of the first flexures and each of the second flexures are curved between their corresponding first gear portion and second gear portion. In some examples, the multi-pivot timing chain additionally or alternatively comprises, wherein the curvature of each of the first flexures and each of the second flexures is inwardly concave toward a center of the corresponding timing link. In some examples, the multi-pivot timing chain additionally or alternatively comprises, wherein each of the first flexures and each of the second flexures comprises a quadrilateral cross-section. In some examples, the multi-pivot timing chain additionally or alternatively comprises, wherein the meshing gear teeth have no backlash. In some examples, the multi-pivot timing chain additionally or alternatively comprises, a plurality of third timing links in a third timing chain layer adjacent to the second timing chain layer, the third timing links coupled together via meshing gear teeth on opposing ends of each of the third timing links, wherein the plurality of pins also rotatably couple the second timing links in the second timing chain layer to the third timing links in the third timing chain layer.

Another aspect provides a computing device, comprising: a flexible display supported by a first display-supporting frame and a second display-supporting frame; and a hinge assembly rotatably coupling the first display-supporting frame to the second display-supporting frame, the hinge assembly comprising a multi-pivot timing chain comprising: a plurality of first timing links in a first timing chain layer, the first timing links coupled together via meshing gear teeth on opposing ends of each of the first timing links; a plurality of second timing links in a second timing chain layer adjacent to the first timing chain layer, the second timing links coupled together via meshing gear teeth on opposing ends of each of the second timing links; and a plurality of pins rotatably coupling the first timing links in the first timing chain layer to the second timing links in the second timing chain layer, wherein each of the first timing links and each of the second timing links comprises: a first gear portion comprising a plurality of first gear teeth; a second gear portion opposite the first gear portion and comprising a plurality of second gear teeth; a first flexure connecting a first side of the first gear portion to a first side of the second gear portion; and a second flexure opposite to the first flexure, the second flexure connecting a second side of the first gear portion to a second side of the second gear portion; wherein the first flexure and the second flexure in at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer. In some examples, the computing device additionally or alternatively comprises, wherein the tension in the first flexure and the second flexure creates the compression in the pair of meshing gear teeth in the second timing chain layer via a first pin of the plurality of pins extending through a first aperture defined in the first gear portion of the at least one of the first timing links, and via a second pin of the plurality of pins extending through a second aperture defined in the second gear portion of the at least one of the first timing links. In some examples, the computing device additionally or alternatively comprises, wherein the first flexure and the second flexure in each of the first timing links are in tension and are configured to cause each pair of meshing gear teeth in the second timing chain layer to be in compression, thereby creating resistance to rotation of the second timing links in the second timing chain layer. In some examples, the computing device additionally or alternatively comprises, wherein the first flexure and the second flexure in each of the second timing links are in tension and are configured to cause each pair of meshing gear teeth in the first timing chain layer to be in compression, thereby creating resistance to rotation of the first timing links in the first timing chain layer. In some examples, the computing device additionally or alternatively comprises, wherein each of the first flexures and each of the second flexures are curved between their corresponding first gear portion and second gear portion. In some examples, the computing device additionally or alternatively comprises, wherein the curvature of each of the first flexures and each of the second flexures is inwardly concave toward a center of the corresponding timing link. In some examples, the computing device additionally or alternatively comprises, wherein each of the first flexures and each of the second flexures comprises a quadrilateral cross-section. In some examples, the computing device additionally or alternatively comprises, wherein the meshing gear teeth have no backlash. In some examples, the computing device additionally or alternatively comprises a plurality of third timing links in a third timing chain layer adjacent to the second timing chain layer, the third timing links coupled together via meshing gear teeth on opposing ends of each of the third timing links, wherein the plurality of pins also rotatably couple the second timing links in the second timing chain layer to the third timing links in the third timing chain layer.

Another aspect provides a method of assembling a multi-pivot timing chain, the multi-pivot timing chain comprising: two first timing links in a first timing chain layer, each of the first timing links comprising gear teeth on opposing ends of first timing link; a second timing link in a second timing chain layer adjacent to the first timing chain layer, the second timing link comprising gear teeth on opposing ends; and first and second pins; wherein each of the first timing links and the second timing link comprise: a first gear portion comprising a plurality of first gear teeth, the first gear portion defining a first aperture; a second gear portion opposite the first gear portion, the second gear portion comprising a plurality of second gear teeth and defining a second aperture; a first flexure connecting a first side of the first gear portion to a first side of the second gear portion; and a second flexure opposite to the first flexure, the second flexure connecting a second side of the first gear portion to a second side of the second gear portion; the method comprising: meshing the gear teeth of the first gear portion of one of the first timing links with the gear teeth of the second gear portion of the other first timing link; inserting the first pin through the second aperture of the second gear portion of the second timing link and through the first aperture of the first gear portion of the one of the first timing links to rotatably couple the second timing link to the one of the first timing links, wherein the first aperture of the first gear portion of the second timing link is misaligned relative to the second aperture of the second gear portion of the other first timing link; and bringing the first aperture of the first gear portion of the second timing link into concentric alignment with the second aperture of the second gear portion of the other first timing link by inserting the second pin through the first aperture of the first gear portion of the second timing link and through the second aperture of the second gear portion of the other first timing link to rotatably couple the second timing link to the other first timing link, thereby creating tension in the first flexure and the second flexure of the second timing link, wherein the tension acts through the first pin and the second pin to compress the meshing gear teeth of the two first timing links, thereby creating resistance to rotation of the two first timing links. In some examples, the method additionally or alternatively comprises, wherein inserting the second pin through the first aperture of the first gear portion of the second timing link and through the second aperture of the second gear portion of the other first timing link comprises lengthening the first flexure and the second flexure of the second timing link It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The terms "first", "second", "third" and the like are used to describe an object or component in relation to another similar object or component. Such adjectives do not imply that such objects or components must be in a given sequence or order, either spatially, temporally, or in any other manner.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A multi-pivot timing chain, comprising:
a plurality of first timing links in a first timing chain layer, the first timing links coupled together via meshing gear teeth on opposing ends of each of the first timing links;
a plurality of second timing links in a second timing chain layer adjacent to the first timing chain layer, the second timing links coupled together via meshing gear teeth on opposing ends of each of the second timing links; and
a plurality of pins rotatably coupling the first timing links in the first timing chain layer to the second timing links in the second timing chain layer,
wherein each of the first timing links and each of the second timing links comprises:
a first gear portion comprising a plurality of first gear teeth;
a second gear portion opposite the first gear portion and comprising a plurality of second gear teeth;
a first flexure connecting a first side of the first gear portion to a first side of the second gear portion; and
a second flexure opposite to the first flexure, the second flexure connecting a second side of the first gear portion to a second side of the second gear portion;

wherein the first flexure and the second flexure of at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer.

2. The multi-pivot timing chain of claim 1, wherein the tension in the first flexure and the second flexure creates the compression in the pair of meshing gear teeth in the second timing chain layer via a first pin of the plurality of pins extending through a first aperture defined in the first gear portion of the at least one of the first timing links, and via a second pin of the plurality of pins extending through a second aperture defined in the second gear portion of the at least one of the first timing links.

3. The multi-pivot timing chain of claim 1, wherein the first flexure and the second flexure in each of the first timing links are in tension and are configured to cause each pair of meshing gear teeth in the second timing chain layer to be in compression, thereby creating resistance to rotation of the second timing links in the second timing chain layer.

4. The multi-pivot timing chain of claim 3, wherein the first flexure and the second flexure in each of the second timing links are in tension and are configured to cause each pair of meshing gear teeth in the first timing chain layer to be in compression, thereby creating resistance to rotation of the first timing links in the first timing chain layer.

5. The multi-pivot timing chain of claim 1, wherein each of the first flexures and each of the second flexures are curved between their corresponding first gear portion and second gear portion.

6. The multi-pivot timing chain of claim 5, wherein the curvature of each of the first flexures and each of the second flexures is inwardly concave toward a center of the corresponding timing link.

7. The multi-pivot timing chain of claim 1, wherein each of the first flexures and each of the second flexures comprises a quadrilateral cross-section.

8. The multi-pivot timing chain of claim 1, wherein the meshing gear teeth have no backlash.

9. The multi-pivot timing chain of claim 1, further comprising a plurality of third timing links in a third timing chain layer adjacent to the second timing chain layer, the third timing links coupled together via meshing gear teeth on opposing ends of each of the third timing links, wherein the plurality of pins also rotatably couple the second timing links in the second timing chain layer to the third timing links in the third timing chain layer.

10. A computing device, comprising:
a flexible display supported by a first display-supporting frame and a second display-supporting frame; and
a hinge assembly rotatably coupling the first display-supporting frame to the second display-supporting frame, the hinge assembly comprising a multi-pivot timing chain comprising:
  a plurality of first timing links in a first timing chain layer, the first timing links coupled together via meshing gear teeth on opposing ends of each of the first timing links;
  a plurality of second timing links in a second timing chain layer adjacent to the first timing chain layer, the second timing links coupled together via meshing gear teeth on opposing ends of each of the second timing links; and
  a plurality of pins rotatably coupling the first timing links in the first timing chain layer to the second timing links in the second timing chain layer,
  wherein each of the first timing links and each of the second timing links comprises:
    a first gear portion comprising a plurality of first gear teeth;
    a second gear portion opposite the first gear portion and comprising a plurality of second gear teeth;
    a first flexure connecting a first side of the first gear portion to a first side of the second gear portion; and
    a second flexure opposite to the first flexure, the second flexure connecting a second side of the first gear portion to a second side of the second gear portion;
  wherein the first flexure and the second flexure in at least one of the first timing links are in tension and are configured to cause a pair of meshing gear teeth in the second timing chain layer to be in compression, thereby creating resistance to rotation of the second timing links that comprise the pair of meshing gear teeth in compression in the second timing chain layer.

11. The computing device of claim 10, wherein the tension in the first flexure and the second flexure creates the compression in the pair of meshing gear teeth in the second timing chain layer via a first pin of the plurality of pins extending through a first aperture defined in the first gear portion of the at least one of the first timing links, and via a second pin of the plurality of pins extending through a second aperture defined in the second gear portion of the at least one of the first timing links.

12. The computing device of claim 10, wherein the first flexure and the second flexure in each of the first timing links are in tension and are configured to cause each pair of meshing gear teeth in the second timing chain layer to be in compression, thereby creating resistance to rotation of the second timing links in the second timing chain layer.

13. The computing device of claim 12, wherein the first flexure and the second flexure in each of the second timing links are in tension and are configured to cause each pair of meshing gear teeth in the first timing chain layer to be in compression, thereby creating resistance to rotation of the first timing links in the first timing chain layer.

14. The computing device of claim 10, wherein each of the first flexures and each of the second flexures are curved between their corresponding first gear portion and second gear portion.

15. The computing device of claim 14, wherein the curvature of each of the first flexures and each of the second flexures is inwardly concave toward a center of the corresponding timing link.

16. The computing device of claim 10, wherein each of the first flexures and each of the second flexures comprises a quadrilateral cross-section.

17. The computing device of claim 10, wherein the meshing gear teeth have no backlash.

18. The computing device of claim 10, further comprising a plurality of third timing links in a third timing chain layer adjacent to the second timing chain layer, the third timing links coupled together via meshing gear teeth on opposing ends of each of the third timing links, wherein the plurality of pins also rotatably couple the second timing links in the second timing chain layer to the third timing links in the third timing chain layer.

19. A method of assembling a multi-pivot timing chain, the multi-pivot timing chain comprising:
- two first timing links in a first timing chain layer, each of the first timing links comprising gear teeth on opposing ends of first timing link;
- a second timing link in a second timing chain layer adjacent to the first timing chain layer, the second timing link comprising gear teeth on opposing ends; and
- first and second pins;
- wherein each of the first timing links and the second timing link comprise:
  - a first gear portion comprising a plurality of first gear teeth, the first gear portion defining a first aperture;
  - a second gear portion opposite the first gear portion, the second gear portion comprising a plurality of second gear teeth and defining a second aperture;
  - a first flexure connecting a first side of the first gear portion to a first side of the second gear portion; and
  - a second flexure opposite to the first flexure, the second flexure connecting a second side of the first gear portion to a second side of the second gear portion;

the method comprising:
- meshing the gear teeth of the first gear portion of one of the first timing links with the gear teeth of the second gear portion of the other first timing link;
- inserting the first pin through the second aperture of the second gear portion of the second timing link and through the first aperture of the first gear portion of the one of the first timing links to rotatably couple the second timing link to the one of the first timing links, wherein the first aperture of the first gear portion of the second timing link is misaligned relative to the second aperture of the second gear portion of the other first timing link; and
- bringing the first aperture of the first gear portion of the second timing link into concentric alignment with the second aperture of the second gear portion of the other first timing link by inserting the second pin through the first aperture of the first gear portion of the second timing link and through the second aperture of the second gear portion of the other first timing link to rotatably couple the second timing link to the other first timing link, thereby creating tension in the first flexure and the second flexure of the second timing link, wherein the tension acts through the first pin and the second pin to compress the meshing gear teeth of the two first timing links, thereby creating resistance to rotation of the two first timing links.

20. The method of claim 19, wherein inserting the second pin through the first aperture of the first gear portion of the second timing link and through the second aperture of the second gear portion of the other first timing link comprises lengthening the first flexure and the second flexure of the second timing link.

* * * * *